United States Patent

[11] 3,595,992

[72] Inventor Dwight J. Poppy
Arlington Heights, Ill.
[21] Appl. No 838,625
[22] Filed July 2, 1969
[45] Patented July 27, 1971
[73] Assignee Zenith Radio Corporation
Chicago, Ill.

[54] AUTOMATIC CHROMINANCE CONTROLLED AMPLIFIER AND COLOR KILLER CIRCUIT
8 Claims, 1 Drawing Fig.

[52] U.S. Cl. 178/5.4 AC, 178/5.4 CK
[51] Int. Cl. H04n 9/48
[50] Field of Search 178/5.4 AC, 5.4

[56] References Cited
UNITED STATES PATENTS
3,272,915 9/1965 Theriault 178/5.4 ACC
3,517,114 6/1970 Carpenter 178/5.4 ACC

*Primary Examiner*—Robert L. Griffin
*Assistant Examiner*—George G. Stellar
*Attorneys*—John J. Pederson and Eugene M. Cummings

ABSTRACT: A color television receiver has a two-stage chrominance channel for amplifying a detected chrominance subcarrier signal. The first chrominance amplifier stage in this channel, a pentode vacuum tube, is gain controlled by an applied control voltage amplitude related to the chrominance signal, and serves to concurrently amplify both the chrominance signal and the applied control voltage. The second chrominance amplifier stage, an NPN transistor, has a diode connected between its collector and base circuits which is forward biased during chrominance reception by the amplified control voltage from the first stage to establish a stabilizing degenerative feedback loop, and reverse biased during the reception of monochrome signals or signals not providing satisfactory color reproduction to permit conduction in the transistor to be interrupted by the amplified control voltage.

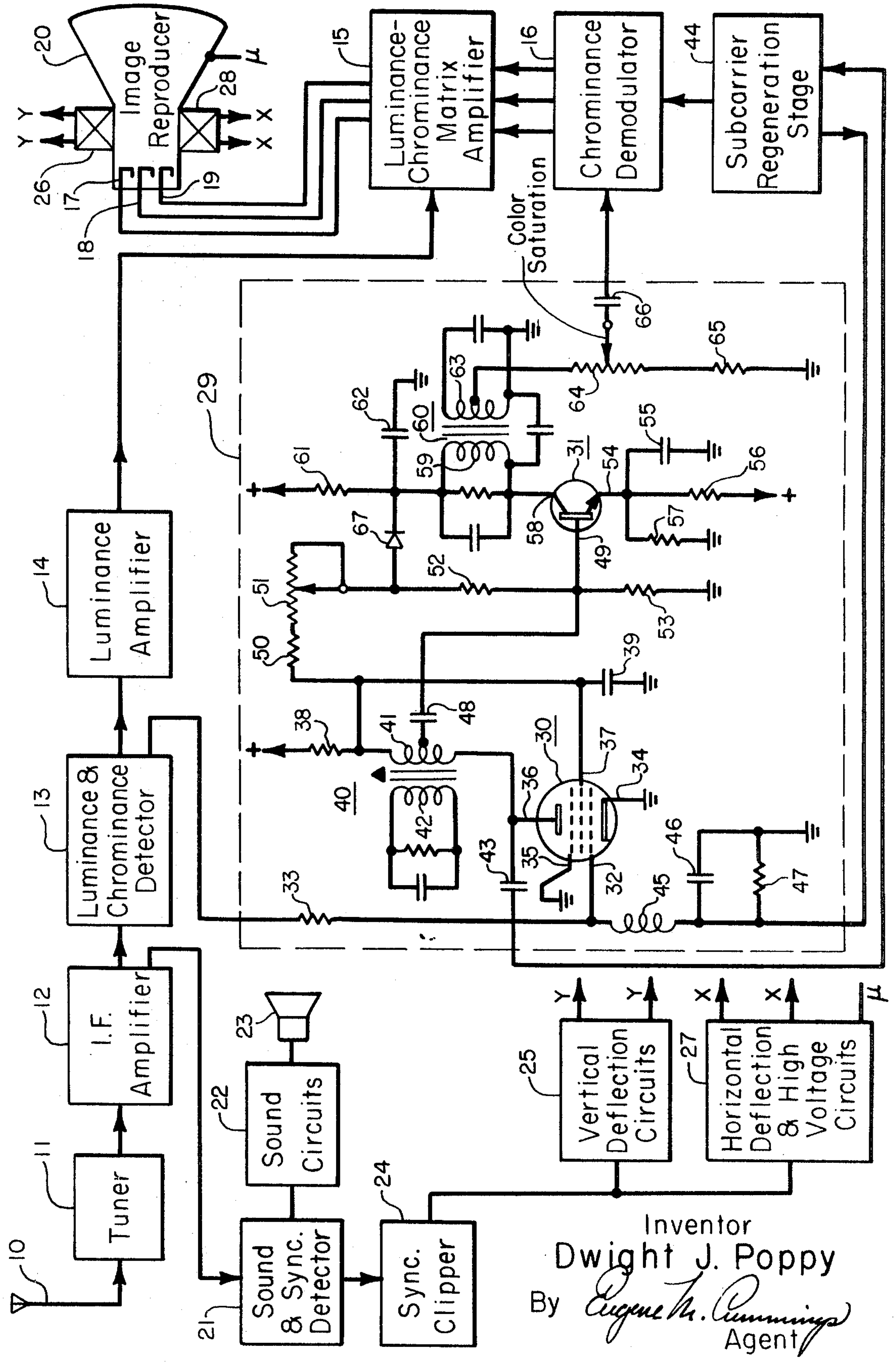
Inventor
Dwight J. Poppy
By Eugene M. Cummings
Agent

AUTOMATIC CHROMINANCE CONTROLLED AMPLIFIER AND COLOR KILLER CIRCUIT

BACKGROUND OF THE INVENTION

The present invention relates to improvements in color television receivers, and more particularly to an improved chrominance amplifier for use in such receivers.

In accordance with present United States standards governing color television transmissions, luminance information, representing elemental brightness variations in a televised image, is transmitted on an amplitude-modulated main carrier component and chrominance information, representing color hue and saturation variations, is transmitted on a phase- and amplitude-modulated 3.58 MHz. subcarrier component. While demodulation of the luminance component may be conveniently accomplished with a conventional AM video detector, demodulation of the chrominance component requires in addition a synchronous detector for obtaining the three color-difference control signals required by the three gun tricolor shadow-mask cathode-ray image reproducer in use today.

For faithful color reproduction it is necessary that variations in the level of the chrominance subcarrier signal as applied to the receiver chrominance demodulator resulting from transmission path irregularities and the like be eliminated, and that this signal which otherwise would have unsymmetrical sidebands because of the skewed frequency response characteristic of the receiver IF amplifier stage, have substantially symmetrical sidebands. To this end present-day color television receivers generally employ one or more chrominance amplifying stages, which may be collectively referred to as a chrominance channel, for processing the chrominance subcarrier signal. These amplifiers are normally of the variable gain type, and employ band pass circuitry for achieving the desired sideband equalization for the subcarrier signal.

To maintain the composite chrominance signal at a constant level, a control circuit responsive to the level of the received synchronizing burst signal, is usually incorporated in the chrominance channel to vary the gain of at least one of the chrominance amplifiers inversely with variations in the incoming chrominance signal level. Equally important, this control circuit functions to disable or "kill" one or more of the amplifiers during reception of monochrome television signals, or signals which would not allow satisfactory color reproduction, to prevent extraneous color information from interfering with an otherwise acceptable monochrome picture. To be completely effective this "killer action" must be virtually instantaneous; i.e., the transition time from color to monochrome operating modes must occur as rapidly as possible. Furthermore, the color-killer circuit must operate in a completely unambiguous manner; it should function to either disable the chrominance channel of the receiver completely, or to translate the full chrominance subcarrier signal to the chrominance demodulator, with no intermediate operational conditions being possible.

One problem associated with the construction of chrominance amplifier circuitry has been that of obtaining long term stability in the individual chrominance amplifier stages without interfering with the operation of the chrominance channel control circuit. Conventional DC feedback circuits, while generally effective for stabilizing the operating point of an amplifier, tend to oppose the imposition of an external control effect and therefore have not heretofore lended themselves to use in a chrominance channel environment, where the individual chrominance amplifiers must of necessity be gain responsive to a control voltage generated by the receiver chrominance channel control circuit.

Accordingly, it is a general object of the invention to provide a new and improved chrominance amplifier for a color television receiver.

It is a more specific object of the invention to provide a new and improved chrominance amplifier for a color television receiver which offers improved stability while remaining gain responsive to an applied control effect.

It is another object of the invention to provide a new and improved chrominance amplifier which offers improved stability while being readily conditionable by an applied control voltage into conductive and nonconductive states.

In accordance with the invention, there is provided in a color television receiver of the type having a source of composite chrominance signals, and a source of control voltage within a first predetermined range during reception of television transmissions providing satisfactory color reproduction and within a second predetermined range during reception of television transmission not providing satisfactory color reproduction, a chrominance amplifier stage comprising means, including an amplifier device having an input electrode coupled to the source of composite chrominance signals, an output electrode and a common electrode, and conditionable into conductive and nonconductive states by an impressed control voltage, for amplifying the composite chrominance signal. Means are included for impressing on the amplifier device at least a portion of the control voltage to condition the device into a conductive state when the control voltage is in the first predetermined range and into a nonconductive state when the control voltage is in the second predetermined range. Means, including a diode forward biased by the control voltage while in the first predetermined range and reverse biased by the control voltage while in the second predetermined range, and coupled between the input and output electrodes, are also included for stabilizing the amplifier device during reception of satisfactory color transmissions.

BRIEF DESCRIPTION OF THE DRAWING

Features of the present invention which are believed to be novel are set forth with particularity in the appended claims. The invention, together with further objects and advantages thereof, may best be understood by reference to the following description taken in connection with the accompanying drawing, in which the single FIGURE is a schematic diagram, partially in block form, of a color television receiver which includes a chrominance amplifier channel constructed in accordance with a preferred embodiment of the invention.

DESCRIPTION OF THE PREFERRED EMBODIMENT

With the exception of certain detailed control circuitry in its chrominance channel, the illustrated receiver is essentially conventional in design, and accordingly only a brief description of its structure and operation need be given here. A received signal is intercepted by an antenna 10 and coupled in a conventional manner to a tuner 11, which includes the usual radio frequency amplifying and heterodyning stages for translating the signal to an intermediate frequency. After amplification by an intermediate-frequency amplifier 12, the signal is applied to a luminance and chrominance detector 13 wherein luminance and chrominance information in the form of a composite video-frequency signal is derived. The luminance component of this composite signal is amplified in a luminance amplifier 14 and applied to a luminance-chrominance matrix amplifier 15, wherein it is combined with red, green and blue color-difference signals from a chrominance demodulator 16 to form suitable drive signals for the red, green and blue guns, 17, 18 and 19, respectively, of the receiver image reproducer, 20. Matrix amplifier 15 is preferably of the type described and claimed in the copending application of Charles H. Heuer and Dwight J. Poppy, Serial No. 838,466, filed July 2, 1969, for Matrix Amplifier and assigned to the present assignee, and chrominance demodulator 16 is preferably of the type described and claimed in the copending application of John L. Rennick, U.S. Pat. No. 3,506,776, issued Apr. 14, 1970, and also assigned to the present assignee. The output signal from intermediate-frequency amplifier 12 is also applied to a sound and sync detector 21, wherein a second composite video-frequency signal is derived which includes both sound and synchronizing components. The sound component is applied to sound circuits 22, wherein conventional sound demodulation and amplification circuitry develops an audio output signal suitable for driving a speaker 23.

Synchronizing information, in the form of vertical and horizontal sync pulses, is separated from the composite signal by a sync clipper 24. A vertical deflection circuit 25 utilizes the separated vertical sync pulses to generate a synchronized vertical-rate sawtooth scanning signal in a vertical deflection winding 26. The horizontal sync pulses from sync clipper 24 are applied to horizontal deflection and high voltage circuits 27, which include conventional reaction-scanning-type circuitry for utilizing these pulses to generate a synchronized horizontal-rate sawtooth scanning current in a horizontal deflection winding 28, and high voltage DC accelerating potential for the ultor electrode $\mu$ of image reproducer 20.

The chrominance component of the composite video-frequency output signal from luminance and chrominance detector 13, which includes a phase and amplitude-modulated subcarrier and a periodically transmitted synchronizing burst signal, is applied to a two-stage band-pass amplifier, chrominance channel 29. This channel, which comprises two amplifying devices, a pentode vacuum tube 30 and an NPN transistor 31, amplifies the applied chrominance subcarrier to a level suitable for application to chrominance demodulator 16. The chrominance signal from detector 13 is applied to the control grid 32 of pentode 30 via a series resistor 33, which in addition to providing isolation for the detector serves as part of the detector load impedance. The cathode 34 and suppressor grid 35 of pentode 30 are grounded, and the anode 36 and screen grid 37 receive operating power from the receiver B+ supply through a plate load resistor 38. A capacitor 39 connected between grid 37 and ground bypasses that element to ground at signal frequencies.

After amplification in pentode 30, the chrominance signal appears across a tuned transformer 40, which has a primary winding 41 serially included in the anode circuit of pentode 30 and a secondary winding 42 tuned to the chrominance subcarrier frequency, 3.58 MHz. A portion of the amplified chrominance signal is coupled by a capacitor 43 from anode 36 to a subcarrier regeneration stage 44, which preferably is of the type described and claimed in the copending application of John L. Rennick, Ser. No. 777,760, filed Nov. 21, 1968, and assigned to the present assignee. Regeneration stage 44 includes circuitry for separating the periodically transmitted reference burst from the chrominance signal, and for utilizing this reference burst to generate the continuous-wave 3.58 MHz. demodulation signal required by chrominance demodulator 16 for synchronous demodulation of the received chrominance signal. Also included in this stage is suitable phase detector circuitry for producing an ACC (automatic chrominance control) voltage amplitude related to the reference burst component. This voltage, which may be said to fall within a first predetermined range during reception of satisfactory color transmissions, and within a second predetermined range during the reception of monochrome transmissions or transmissions not providing satisfactory color reproduction, typically is a negative voltage varying between −6 volts during color reception and 0 volts during monochrome reception.

Pentode 30 has a remote cutoff grid control characteristic, which allows its gain to be controlled by application of a bias to its control grid. Advantage is taken of this fact by applying to that grid the ACC voltage developed in subcarrier regeneration stage 44, thereby causing the gain of pentode 30 to vary inversely with variations in the level of the chrominance signal applied to regeneration stage 44, to maintain the amplified chrominance signal therefrom substantially constant. The ACC voltage is applied to grid 32 via a series inductor 45, which serves to isolate the video-frequency signal applied to that grid from regeneration stage 44. An RC time constant circuit, comprising a capacitor 46 and a resistor 47 connected in parallel from the ACC output of stage 44 to ground, conditions the response characteristic of the ACC circuit to prevent spurious gain variations with momentary changes in chrominance level.

The amplified subcarrier from pentode 30 is coupled from a tap on winding 41 by a capacitor 48 to the input electrode, or base 49, of transistor 31. Besides serving as a variable-gain AC amplifier for the chrominance signal, pentode 30 also serves as a DC amplifier for the applied ACC control voltage, and a predetermined portion of the amplified ACC signal, which appears at the bypassed juncture of resistor 38 and winding 41, is coupled to base 49 by a resistive voltage divider serially comprising a resistor 50, a potentiometer 51, a resistor 52, and a resistor 53.

The common electrode, or emitter 54, of transistor 31 is bypassed to ground at signal frequencies by a capacitor 55 and biased at a predetermined positive potential by means of a voltage divider serially comprising a resistor 56 connected from B+ to the emitter and a resistor 57 connected from the emitter to ground. The potential to which the emitter is biased is such that the base-emitter junction will be reverse biased and transistor 31 will be cut off by the amplified ACC signal from pentode 30 as the ACC voltage from regeneration stage 44 enters its second predetermined range, corresponding to the reception of monochrome or unsatisfactory color transmissions.

The output electrode, or collector 58, of transistor 31 receives operating power from the receiver B+ supply via the primary winding 59 of an interstage transformer 60 and a collector load resistor 61. The juncture of resistor 61 and winding 59 is bypassed to ground at signal frequencies by a capacitor 62, and windings 59 and 63 are tuned to 3.58 MHz. by individual shunt-connected capacitors. The amplified chrominance subcarrier signal from transistor 31 is coupled from a tap on the secondary winding 63 of transformer 60 to one end terminal of a potentiometer 64, which serves as the receiver color saturation control. The other end terminal of potentiometer 64 is connected to ground by a resistor 65, the combination forming a resistive voltage divider such that a variable amount of the amplified chrominance signal can be selected for application to demodulator 16 by positioning the arm of the potentiometer. A capacitor 66 couples the signal from the arm to the input of chrominance demodulator 16, wherein it is demodulated to obtain color-difference signals, which, when matrixed with the luminance signal in matrix amplifier 15, form color control signals suitable for application to the three guns of image reproducer 20.

In accordance with the invention, a diode 67 is coupled between the collector and base of transistor 31 to enhance the DC stability of that device and improve the so-called "color-killer action" of the chrominance channel control circuit. This diode functions during reception of satisfactory color transmissions to establish a degenerative feedback network; any change in voltage at the collector giving rise to a counteracting change in DC level at the base.

Ordinarily, a feedback network of this type would not be desirable in a chrominance amplifier since it would oppose the "color-killer" action of the chrominance channel control circuit. Specifically, during a transition from color to monochrome operation, the negative-polarity ACC voltage applied to pentode 30 decreases, causing pentode 30 to conduct more heavily. The resulting decrease in anode voltage is translated to the base of transistor 31 by the resistive voltage divider and causes conduction in that device to decrease and the voltage on collector 58 to increase. Degenerative feedback between the collector and base during this transition would cause a portion of this increase to be coupled back to the base, opposing any further decrease in conduction in transistor 31 and tending to prevent that device from being cut off.

However, in accordance with the invention, as the ACC voltage becomes less negative and the voltage applied to base 49 continues to decrease (i.e., become less positive), a point is ultimately reached at which the voltage at the juncture of winding 59 and resistor 61 is equal to or greater than the voltage appearing at the juncture of resistors 51 and 52, at which time diode 67 suddenly becomes reverse biased. This eliminates the degenerative DC feedback loop and accelerates the transition of transistor 31 from an operative to an inoperative state as the received chrominance signal continues to deteriorate and the ACC voltage continues to fall. Thus, diode 67 is forward biased during color reception to stabilize the amplifier and reverse biased during monochrome or nonsynchronous operating conditions to facilitate the transition between color and monochrome operating modes.

The requisite biasing of diode 67 is accomplished by selection of the elements of the resistive voltage divider. The exact point at which the diode becomes reverse biased can be varied by adjustment of potentiometer 51, which serves as the receiver color-killer threshold adjustment. The resistances of the emitter voltage divider must be chosen to maintain emitter 54 slightly less positive than base 49 during color reception to avoid saturation of transistor 31, while allowing the emitter-base junction of the transistor to become reverse biased by the amplified ACC signal applied to its base during monochrome reception.

Thus, the resistive voltage divider performs two functions during color reception; it translates a portion of the amplified ACC signal from the first chrominance amplifier to the second chrominance amplifier, and serves in conjunction with diode 67 to establish a degenerative feedback loop for stabilizing the operation of transistor 31. This is done with the singular addition of a diode and a tap on a resistive voltage divider. Of course, it will be appreciated that other bias arrangements are possible for achieving these results.

The following are a set of component values used for the illustrated embodiment which have been found to provide satisfactory operation in accordance with the invention. It will be appreciated that these values are given by way of example, and that other values may be substituted therefore without departing from the principles of the present invention.

| | |
|---|---|
| V30 | ½ 6KT8 |
| TR31 | Fairchild SE 5025 |
| R33 | 390 ohms |
| R38 | 22,000 ohms 3 watts |
| C39 | 0.1 microfarads |
| C43 | 47 picofarads |
| L45 | 27.2 microhenries |
| C46 | 0.1 microfarad |
| R47 | 3,300,000 ohms ½ watt |
| C48 | 0.001 microfarad |
| R50 | 100,000 ohms ½ watt |
| R51 | 250,000 ohms linear tapes |
| R52 | 12,000 ohms ½ watt |
| R53 | 4,700 ohms ½ watt |
| C55 | 0.01 microfarads |
| R56 | 680 ohms 1 watt |
| R57 | 100 ohms ½ watt |
| R61 | 820 ohms ½ watt |
| C62 | 0.01 microfarad |
| R64 | 500 ohms linear tapes |
| R65 | 470 ohms ½ watt |
| C66 | 0.01 microfarad |

While a particular embodiment of the invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

I claim:

1. In a color television receiver of the type having a source of composite chrominance signals, and a source of control voltage within a first predetermined range during reception of television transmissions providing satisfactory color reproduction and within a second predetermined range during reception of television transmissions not providing satisfactory color reproduction, a chrominance amplifier stage comprising:

means, including an amplifier device having an input electrode coupled to said source of composite chrominance signals, an output electrode and a common electrode, and conditionable into conductive and nonconductive states by an impressed control voltage, for amplifying said composite chrominance signal;

means for impressing on said amplifier device at least a portion of said control voltage to condition said device into a conductive state when said control voltage is in said first predetermined range and into a nonconductive state when said control voltage is in said second predetermined range;

and means, including a diode forward biased by said control voltage while said voltage is in said first predetermined range and reverse biased by said control voltage while said voltage is in said second predetermined range, and coupled between said input and output electrodes, for stabilizing said amplifier device during reception of satisfactory color transmissions.

2. A chrominance amplifier stage as described in claim 1, wherein said stabilizing means establishes a degenerative DC feedback path between said input and output electrodes only while said control voltage is in said first predetermined range.

3. A chrominance amplifier stage as described in claim 2, wherein said means for impressing said control voltage on said amplifier device comprises a voltage divider coupled between said control voltage source and ground and having first and second taps, and wherein said diode is coupled between said output electrode and said first tap and said input electrode is coupled to said second tap.

4. A chrominance amplifier stage as described in claim 3, wherein said amplifying means includes means for supplying operating power to said output electrode of said amplifier device, the voltage developed thereon and at the terminal of said diode coupled thereto varying as a function of the control voltage applied to said input electrode, and wherein said voltage divider applies to the remaining terminal of said diode a predetermined portion of said control voltage such that said diode is reverse biased only while said control voltage is in said second predetermined range.

5. A chrominance amplifier stage as described in claim 4, wherein said amplifier device is a transistor, said input electrode is a base, said output electrode is a collector and said common electrode is an emitter.

6. A chrominance amplifier stage as described in claim 5, wherein said diode has its cathode coupled to said collector and its anode coupled to said first tap of said voltage divider.

7. A chrominance amplifier stage as described in claim 6, wherein said control voltage source and said composite chrominance signal source in said television receiver comprises an additional chrominance amplifier stage, and wherein said base is coupled to said additional stage by means including a DC blocking capacitor and said voltage divider comprises at least three resistive elements.

8. In a color television receiver of the type having a source of composite chrominance signal including an amplitude- and phase-modulated subcarrier component and a periodically transmitted synchronizing burst component, a chrominance amplifying channel comprising:

means, including a first amplifier device gain-dependent on an applied control voltage, for simultaneously amplifying said applied control voltage and said chrominance subcarrier synchronizing burst components;

means coupled to the output of said first amplifier device for developing a control voltage dependent on the amplitude of said burst component, said control voltage having a first predetermined range of values during reception of television transmissions providing satisfactory color reproduction, and a second predetermined range of values during reception of transmissions not providing satisfactory color reproduction;

means for applying said control voltage to said first amplifier device to control the gain of said device inversely with the amplitude of said reference burst signal to maintain the amplitude of said composite signal substantially constant;

means, including a second amplifier device having input, output, and common electrodes and conditionable into conductive and nonconductive states by an externally applied control voltage for providing additional amplification to the chrominance subcarrier component from said first amplifier device;

means for applying to said second amplifier device a predetermined portion of the amplified control signal from said first amplifier device to condition said second device into a conductive state when said control voltage is in said first predetermined range and into a nonconductive state when said control voltage is in said second predetermined range;

and means, including a diode forward biased by said control voltage while said voltage is in said first predetermined range and reverse biased by said control voltage while said voltage is in said second predetermined range, and coupled between said input and output electrodes, for providing degenerative feedback to stabilize said second amplifier device only during reception of satisfactory color transmissions.